(12) United States Patent
Breiner et al.

(10) Patent No.: US 8,389,659 B2
(45) Date of Patent: Mar. 5, 2013

(54) EMULSION POLYMERS, AQUEOUS DISPERSIONS AND METHOD FOR PRODUCING THE SAME

(75) Inventors: Christine Breiner, Laudenbach (DE); Joachim Knebel, Alsbach-Haehnlein (DE); Gerold Schmitt, Aschaffenburg (DE); Dieter Tessmer, Darmstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 386 days.

(21) Appl. No.: 12/678,160

(22) PCT Filed: Oct. 6, 2008

(86) PCT No.: PCT/EP2008/063356
§ 371 (c)(1),
(2), (4) Date: Mar. 15, 2010

(87) PCT Pub. No.: WO2009/047234
PCT Pub. Date: Apr. 16, 2009

(65) Prior Publication Data
US 2010/0261840 A1    Oct. 14, 2010

(30) Foreign Application Priority Data
Oct. 8, 2007  (DE) .......................... 10 2007 048 192

(51) Int. Cl.
*C08F 118/02* (2006.01)
*C08L 75/04* (2006.01)
*C08L 33/10* (2006.01)
*B32B 5/16* (2006.01)

(52) U.S. Cl. ........ 526/319; 524/507; 524/502; 524/832; 428/402

(58) Field of Classification Search .................. 526/319; 524/507, 502, 832; 428/402
See application file for complete search history.

(56) References Cited

U.S. PATENT DOCUMENTS

| 4,312,797 | A  | * | 1/1982 | Aihara et al. ................. 524/549 |
| 6,177,510 | B1 | * | 1/2001 | Saam ............................ 524/773 |
| 2004/0059022 | A1 | * | 3/2004 | Tsukiyama et al. .......... 523/201 |

FOREIGN PATENT DOCUMENTS

| CN | 1492886 A | * | 4/2004 |
| DE | 27 09 981 |   | 9/1978 |
| EP | 1 044 993 |   | 10/2000 |
| EP | 1044993 A1 | * | 10/2000 |
| GB | 2 053 934 |   | 2/1981 |
| GB | 2053934 A | * | 2/1981 |

OTHER PUBLICATIONS

U.S. Appl. No. 12/990,164, filed Oct. 28, 2010, Schuetz, et al.
U.S. Appl. No. 12/678,597, filed Mar. 17, 2010, Breiner, et al.
Office Action issued Feb. 15, 2012 in Chinese Patent Application No. 200880110586.X (with English translation).

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

The present invention relates to an emulsion polymer comprising at least one (meth)acrylate segment which comprises 1% to 30% by weight of units derived from (meth)acrylates which in the alkyl radical have at least one double bond and 8 to 40 carbon atoms, 0.1% to 10% by weight of units derived from monomers containing acid groups, and 50% to 98.9% by weight of units derived from (meth)acrylates having 1 to 6 carbon atoms in the alkyl radical, based in each case on the weight of the (meth)acrylate segment, the emulsion polymer having a particle radius of at least 50 nm.

36 Claims, No Drawings

EMULSION POLYMERS, AQUEOUS DISPERSIONS AND METHOD FOR PRODUCING THE SAME

The present invention relates to emulsion polymers and to aqueous dispersions which comprise these emulsion polymers. The present invention further relates to processes for preparing these dispersions and emulsion polymers.

Coating materials, more particularly paints and varnishes, have for a long time been prepared synthetically. Many of these coating materials are based on what are called alkyd resins, which are prepared using polybasic acids, alcohols and fatty acids and/or fatty acid derivatives. One particular group of these alkyd resins form crosslinked films on exposure to oxygen, the crosslinking taking place by oxidation with involvement of unsaturated groups. Many of these alkyd resins comprise organic solvents or dispersion media to allow the resins to be applied in a thin film to coating elements. The use of these solvents ought, however, to be abandoned on grounds of environmental protection and of occupational safety. Corresponding resins have therefore been developed based on aqueous dispersions, but their stability on storage is limited. Furthermore, the water absorption of many alkyd resins is too high, or their solvent resistance or their hardness is too low. Attempts have been undertaken, accordingly, to modify or replace the conventional, alkyd-based coating materials outlined above.

For example, U.S. Pat. No. 4,010,126 discloses compositions which comprise an alkyd resin which is modified with (meth)acrylate polymers and which is subsequently used in an emulsion polymerization. The compositions described are prepared over a number of steps, with the consequence that the resins described are very costly and inconvenient to prepare.

A coating composition based on solution polymers based on vinyl monomers, for example, is described in DE-A-101 06 561. That composition, however, includes a high fraction of organic solvents.

Also known, moreover, are aqueous dispersions based on (meth)acrylate polymers. For example, the publication DE-A-41 05 134 describes aqueous dispersions which can be used as binders in coating materials. The preparation of those binders, however, takes place over several stages, in which first a solution polymer is produced which, following neutralization, is used in an emulsion polymerization.

Furthermore, DE-A-25 13 516 describes aqueous dispersions comprising polymers based on (meth)acrylates, where some of the (meth)acrylates contain unsaturated alcohol residues. A particular disadvantage of the dispersions described is their costly and inconvenient preparation, the polymers being obtained on the basis of (meth)acrylates by solution polymerization. In that case these polymers have a high fraction of acid groups, in the range from 5% to 20% by weight, based on the solution polymer.

The publication DE-A-26 38 544 describes oxidatively drying aqueous dispersions which comprise emulsion polymers based on (meth)acrylates, with some of the (meth)acrylates used having unsaturated alcohol residues. However, chain transfer agents have been used to prepare the emulsion polymers, and so the solubility of the emulsion polymer is high.

Furthermore, aqueous dispersions comprising oxidatively drying polymers are set out in F.-B. Chen, G. Bufkin, "Crosslinkable Emulsion Polymers by Autooxidation II", Journal of Applied Polymer Science, Vol. 30, 4551-4570 (1985). The polymers contain 2% to 8% by weight of units derived from (meth)acrylates having unsaturated, long-chain alcohol residues. These polymers, however, do not contain any units obtained by polymerization of monomers containing acid groups. For many applications the shelf life of these dispersions and also the hardness of the coatings are inadequate.

Moreover, the publication U.S. Pat. No. 5,750,751 describes vinyl-monomer-based polymers which are able to crosslink at room temperature. The polymers can be obtained both by solution polymerization and by emulsion polymerization. The monomer mixtures for polymerization may comprise, among others, (meth)acrylates whose alcohol residues have been modified with unsaturated fatty acids. The polymers obtained by solution polymerization and emulsion polymerization of modified (meth)acrylates display a high solubility, on account of the use of chain transfer agents. A disadvantage of the coating materials described in U.S. Pat. No. 5,750,751, however, is that it is necessary to add plasticizing solvents, which should be avoided on environmental grounds.

An improvement in this respect is achieved through the teaching of the publication EP-A-1 044 993. This document describes aqueous dispersions based on (meth)acrylates. The mixtures for polymerization comprise (meth)acrylates which have been modified by unsaturated fatty acids. A key aspect of this solution is the use of polymers which have a particularly broad molecular weight distribution, the numerical average of the molecular weight being situated within the range from 300 to 3000 g/mol. A disadvantage of these systems, however, is that the resulting films are too soft for many applications.

The document WO 2006/013061, moreover, describes dispersions which comprise particles based on (meth)acrylates. The monomer mixtures used to prepare the particles comprise (meth)acrylates which have been modified by unsaturated fatty acids. In the examples, however, no monomers which comprise acid groups are polymerized. Furthermore, the fraction of (meth)acrylates modified with unsaturated fatty acids is very high. Disadvantages of the dispersions described in WO 2006/013061 are more particularly their complex preparation and the high fraction of residual monomers. A minimum fraction of soluble emulsion polymer is not described in this publication.

The prior art, furthermore, has also disclosed dispersions which, as well as polymers based on (meth)acrylates, can also comprise alkyd resins. The document WO 98/22545, for example, describes polymers with units derived from (meth)acrylates having unsaturated alcohol residues. These polymers can be used together with alkyd resins. However, solvents are used in order to prepare coating materials from the polymers described. Aqueous dispersions are not described in WO 98/22545. Accordingly, these compositions are hampered by the disadvantages described above.

Furthermore the Japanese publication JP 59011376 describes emulsion polymers based on (meth)acrylates. The dispersions, for a solids content of approximately 40%, have a dynamic viscosity of at least 200 mPas. This publication does not specify a particle size. Owing to the high viscosity of the dispersion, however, it can be assumed that the emulsion polymers have a particle size below 40 nm. A disadvantage of the dispersions described in this publication is their short shelf life.

In view of the prior art, then, it is an object of the present invention to provide emulsion polymers which can be processed to coating materials and coatings with outstanding properties. More particularly the dispersions and emulsion polymers ought to have a very low residual monomer content. Additionally, therefore, it was an object of the present invention to provide a dispersion which has a particularly long storage life and shelf life. Furthermore, the intention was that the hardness of the coatings obtainable from coating materials with the emulsion polymers can be varied over a wide range. More particularly the intention was that particularly hard, scratch-resistant coatings can be obtained. A further object can be seen in the provision of emulsion polymers which can be used to obtain coating materials without volatile organic solvents. The coatings obtainable from the aqueous dispersions ought to have a high weathering stability, more particularly a high UV stability. Furthermore, the films obtainable from the aqueous dispersions ought after a short time to feature a low tack.

These objects and also others which, although not explicitly stated, are nevertheless readily inferable or derivable from the circumstances discussed in the introduction are achieved by emulsion polymers having all of the features of Claim 1. Judicious modifications of the emulsion polymers of the invention are protected in dependent claims.

The present invention accordingly provides an emulsion polymer comprising at least one (meth)acrylate segment which comprises
1% to 30% by weight of units derived from (meth)acrylates which in the alkyl radical have at least one double bond and 8 to 40 carbon atoms,
0.1% to 10% by weight of units derived from monomers containing acid groups, and
50% to 98.9% by weight of units derived from (meth)acrylates having 1 to 6 carbon atoms in the alkyl radical, based in each case on the (meth)acrylate segment,
and which is characterized in that the emulsion polymer has a particle radius of at least 50 nm.

Through the measures according to the invention it is additionally possible to obtain advantages including the following:

The dispersions and emulsion polymers of the invention have a very low residual monomer content.

The hardness of the coatings obtainable from dispersions of the invention with the emulsion polymers can be varied over a wide range. In one preferred modification, in accordance with the invention, it is possible more particularly to obtain particularly hard, scratch-resistant coatings. The coatings obtainable from the dispersions and emulsion polymers of the invention exhibit a surprisingly high solvent resistance, which is manifested more particularly in tests with methyl isobutyl ketone (MIBK) or ethanol. For instance, the coatings obtained exhibit an outstanding classification in the context more particularly of experiments in accordance with the DIN 68861-1 furniture test. In this case the coatings can be cleaned even with non-polar solvents, more particularly with wash benzine, without the coating being irreversibly damaged as a result.

Coating materials obtainable using the emulsion polymers of the invention generally require no volatile organic solvents. Furthermore, the dispersions of the invention exhibit a high level of storage stability, a long shelf life and very good storage properties. More particularly there is virtually no aggregate formed.

The coatings obtainable from the aqueous dispersions exhibit a high level of weathering stability, more particularly a high UV stability. The films obtainable from the aqueous dispersions, furthermore, after a short time feature a low tack. Furthermore, the coating materials of the invention exhibit high wet-film stability and also an increased open time.

In addition, the coatings obtainable from the dispersions of the invention exhibit, on numerous substrates, particularly high strength of adhesion, abrasion resistance and durability. Preferred coatings, and substrates coated with the coatings of the invention, may be exposed, in particular, to high mechanical loads without the coating cracking.

The dispersions and emulsion polymers of the invention can be prepared inexpensively on a large scale. The dispersions and emulsion polymers of the invention are eco-friendly and can be prepared and processed safely and without great cost and complexity. In this respect the dispersions of the invention exhibit a very high shear stability.

The emulsion polymers of the invention comprise at least one (meth)acrylate segment. The expression "emulsion polymer" denotes herein a macromolecular compound which can be obtained by emulsion polymerization. The term "segment" denotes the fact that the emulsion polymer comprises at least one section with repeating (meth)acrylate units. In this context the emulsion polymer may consist of one segment thus constructed, or may have further segments. The emulsion polymers can be obtained preferably by means of free-radical addition polymerization.

Accordingly, the weight fraction of units is a product of the weight fractions of corresponding monomers that are used for the preparation of the polymers. The weight fraction of the (meth)acrylate segment, based on the weight of the emulsion polymer, is preferably at least 10% by weight, more preferably at least 20% by weight. The emulsion polymer preferably comprises at least 40%, more preferably at least 60% and very preferably at least 90% by weight of (meth)acrylates.

The (meth)acrylate segment comprises 1 to 30%, preferably 5% to 25% and more preferably 10% to 20% by weight of units derived from (meth)acrylates which in the alkyl radical have at least one double bond and 8 to 40 carbon atoms, based on the total weight of the (meth)acrylate segment.

The expression (meth)acrylates encompasses methacrylates and acrylates and also mixtures of both. (Meth)acrylates which in the alkyl radical have at least one double bond and 8 to 40 carbon atoms are esters of (meth)acrylic acid whose alcohol residue has at least one double bond and 8 to 40 carbon atoms. The alkyl radical or alcohol residue may contain preferably 10 to 30 and more preferably 12 to 20 carbon atoms, it being possible for this radical to include heteroatoms, more particularly oxygen, nitrogen or sulphur atoms. The alcohol residue may have one, two, three or more double bonds. The polymerization conditions under which the emulsion polymer is prepared are preferably selected such as to maximize the fraction of the double bonds of the alcohol residue that are retained during the polymerization. This may be done, for example, by sterically hindering the double bonds present in the alcohol residue.

The iodine number of the (meth)acrylates for use for preparing the emulsion polymers and containing in the alkyl radical at least one double bond and 8 to 40 carbon atoms is preferably at least 40, more preferably at least 80 and very preferably at least 140 g iodine/100 g (meth)acrylate.

(Meth)acrylates of this kind conform in general to the formula (I)

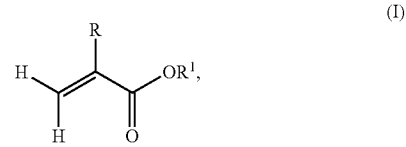

(I)

in which the radical R represents hydrogen or methyl and $R^1$ denotes a linear or branched radical having 8 to 40 carbon atoms that contains at least one double bond.

(Meth)acrylates which in the alkyl radical have at least one double bond and 8 to 40 carbon atoms may be obtained, for example, by esterification of (meth)acrylic acid, reaction of (meth)acryloyl halides or transesterification of (meth)acrylates with alcohols which have at least one double bond and 8 to 40 carbon atoms. These reactions are set out in, for example, Ullmann's Encyclopaedia of Industrial Chemistry, 5th edition on CD-ROM, or F.-B. Chen, G. Bufkin, "Crosslinkable Emulsion Polymers by Autooxidation I", Journal of Applied Polymer Science, Vol. 30, 4571-4582 (1985).

The alcohols that are suitable for this purpose include, among others, octenol, nonenol, decenol, undecenol, dodecenol, tridecenol, tetradecenol, pentadecenol, hexadecenol, heptadecenol, octadecenol, nonadecenol, eicosenol, docosenol, octan-dien-ol, nonan-dien-ol, decan-dien-ol, undecan-dien-ol, dodecan-dien-ol, tridecan-dien-ol, tetradecan-dien-ol, pentadecan-dien-ol, hexadecan-dien-ol, heptadecan-dien-ol, octadecan-dien-ol, nonadecan-dien-ol, eicosan-dien-ol and/or docosan-dien-ol. These so-called fatty alcohols are in some cases available commercially or can be obtained from fatty acids, that reaction being set out in, for example, F.-B. Chen, G. Bufkin, Journal of Applied Polymer Science, Vol. 30, 4571-4582 (1985).

The preferred (meth)acrylates obtainable by this process include, more particularly, octadecan-dien-yl (meth)acrylate, octadecan-trien-yl (meth)acrylate, hexadecenyl (meth)acrylate, octadecenyl (meth)acrylate and hexadecan-dien-yl (meth)acrylate.

Furthermore, (meth)acrylates which in the alkyl radical have at least one double bond and 8 to 40 carbon atoms can also be obtained by reacting unsaturated fatty acids with (meth)acrylates which have reactive groups in the alcohol residue. The reactive groups include, more particularly, hydroxyl groups and also epoxy groups. Accordingly it is also possible to make use, for example, of hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate, 2,5-dimethyl-1,6-hexanediol (meth)acrylate, 1,10-decanediol (meth)acrylate; or (meth)acrylates containing epoxy groups, an example being glycidyl (meth)acrylate, as reactants for preparing the aforementioned (meth)acrylates.

Suitable fatty acids for reaction of the aforementioned (meth)acrylates are in many cases available commercially and are obtained from natural sources. They include, among others, undecylenic acid, palmitoleic acid, oleic acid, elaidinic acid, vaccenic acid, eicosenoic acid, cetoleic acid, erucic acid, nervonic acid, linoleic acid, linolenic acid, arachidonic acid, timnodonic acid, clupanodonic acid and/or cervonic acid.

The preferred (meth)acrylates which are obtainable by this process include, more particularly, (meth)acryloyloxy-2-hydroxypropyl-linoleic ester, (meth)acryloyloxy-2-hydroxypropyl-linolenic ester and (meth)acryloyloxy-2-hydroxypropyl-oleic ester.

The reaction of the unsaturated fatty acids with (meth)acrylates which have reactive groups in the alcohol residue is known per se and set out for example in DE-A-41 05 134, DE-A-25 13 516, DE-A-26 38 544 and U.S. Pat. No. 5,750,751.

The (meth)acrylates with at least one double bond that are set out above may be used individually or as a mixture of two or more (meth)acrylates.

Surprising advantages are displayed more particularly by (meth)acrylate segments which comprise a high fraction of units derived from (meth)acryloyloxy-2-hydroxypropyl-linoleic ester. By this means it is possible more particularly to obtain relatively scratch-resistant, solvent-resistant coatings, the coating materials being particularly easy to process and having a surprisingly high storage stability.

These advantages can be achieved more particularly with (meth)acrylate segments which comprise at least 20%, preferably at least 40% and very preferably at least 50% by weight of units derived from (meth)acryloyloxy-2-hydroxypropyl-linoleic ester, based on the weight of the units derived from (meth)acrylates which in the alkyl radical have at least one double bond and 8 to 40 carbon atoms. Preferably the (meth)acrylate segment contains 45% to 80%, more preferably 55% to 70%, by weight of units derived from (meth)acryloyloxy-2-hydroxypropyl-linoleic ester, based on the weight of the units derived from (meth)acrylates which in the alkyl radical have at least one double bond and 8 to 40 carbon atoms.

According to a further aspect of the present invention, preference is given to (meth)acrylate segments which comprise at least 5%, preferably at least 10% and more preferably at least 15% by weight of units derived from (meth)acryloyloxy-2-hydroxypropyl-oleic ester, based on the weight of the units derived from (meth)acrylates which in the alkyl radical have at least one double bond and 8 to 40 carbon atoms. Preferably the polymer contains 15% to 45%, more preferably 20% to 35%, by weight of units derived from (meth)acryloyloxy-2-hydroxypropyl-oleic ester, based on the weight of the units derived from (meth)acrylates which in the alkyl radical have at least one double bond and 8 to 40 carbon atoms.

Particular improvements can be achieved, furthermore, if the weight ratio of units derived from (meth)acryloyloxy-2-hydroxypropyl-linoleic ester to units derived from (meth)acryloyloxy-2-hydroxypropyl-oleic ester is greater than or equal to 1, this weight ratio being more preferably in the range from 8:1 to 1:1, with particular preference 5:1 to 3:2.

Furthermore, the (meth)acrylate segment of the emulsion polymers of the invention comprises 0.1% to 10%, preferably 0.5% to 8% and more preferably 1% to 5% by weight of units derived from monomers containing acid groups, based on the total weight of the (meth)acrylate segment.

Monomers containing acid groups are compounds which can be copolymerized preferably free-radically with the (meth)acrylates set out above. They include, for example, monomers having a sulphonic acid group, such as vinylsulphonic acid, for example; monomers having a phosphonic acid group, such as vinylphosphonic acid, for example; and unsaturated carboxylic acids, such as methacrylic acid, acrylic acid, fumaric acid and maleic acid, for example. Methacrylic acid and acrylic acid are particularly preferred. The monomers containing acid groups can be used individually or as a mixture of two, three or more monomers containing acid groups.

The (meth)acrylate segment of the emulsion polymers of the invention further comprises 50% to 98.9%, preferably 60% to 95% and more preferably 70 to 90% by weight of units derived from (meth)acrylates having 1 to 6 carbon atoms in the alkyl radical, based on the total weight of the (meth)acrylate segment.

(Meth)acrylates of this kind conform generally to the formula (II)

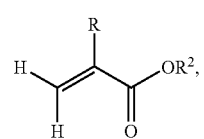

(II)

in which the radical R represents hydrogen or methyl and $R^2$ denotes a linear or branched radical having 1 to 6 carbon atoms, preferably 1 to 4 carbon atoms.

These include, more particularly, (meth)acrylates deriving from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate and pentyl (meth)acrylate, hexyl (meth)acrylate;

cycloalkyl (meth)acrylates, such as cyclopentyl (meth)acrylate, cyclohexyl (meth)acrylate; and (meth)acrylates deriving from unsaturated alcohols, such as 2-propynyl (meth)acrylate, allyl (meth)acrylate and vinyl (meth)acrylate.

Particular preference is given to using mixtures comprising methacrylates and acrylates. Thus it is possible more particularly to use mixtures of methyl methacrylate and acrylates having 2 to 6 carbons, such as ethyl acrylate, butyl acrylate and hexyl acrylate.

In addition to the units referred to above, the (meth)acrylate segment of the emulsion polymers of the invention may have units derived from comonomers. These comonomers differ from the units of the emulsion polymer that have been set out above, but can be copolymerized with the monomers set out above.

They include, for example, (meth)acrylates having at least 7 carbon atoms in the alkyl radical and deriving from saturated alcohols, such as, for example, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate; cycloalkyl (meth)acrylates, such as 3-vinylcyclohexyl (meth)acrylate, bornyl (meth)acrylate, cycloalkyl (meth)acrylates, such as 2,4,5-tri-t-butyl-3-vinylcyclohexyl (meth)acrylate, 2,3,4,5-tetra-t-butylcyclohexyl (meth)acrylate; nitriles of (meth)acrylic acid and other nitrogen-containing methacrylates, such as N-(methacryloyloxyethyl)diisobutylketimine, N-(methacryloyloxyethyl) dihexadecylketimine, methacryloylamidoacetonitrile, 2-methacryloyloxyethylmethylcyanamide, cyanomethyl methacrylate; aryl (meth)acrylates, such as benzyl (meth)acrylate or phenyl (meth)acrylate, it being possible for each of the aryl radicals to be unsubstituted or to be substituted up to four times; (meth)acrylates which contain two or more (meth)acrylic groups, glycol di(meth)acrylates, such as ethylene glycol di(meth)acrylate, diethylene glycol di(meth)acrylate, triethylene glycol di(meth)acrylate, tetra- and polyethylene glycol di(meth)acrylate, 1,3-butanediol (meth)acrylate, 1,4-butanediol (meth)acrylate, 1,6-hexanediol di(meth)acrylate, glycerol di(meth)acrylate; dimethacrylates of ethoxylated bisphenol A;

(meth)acrylates having three or more double bonds, such as glycerol tri(meth)acrylate, trimethylolpropane tri(meth)acrylate, pentaerythritol tetra(meth)acrylate and dipentaerythritol penta(meth)acrylate;

vinyl halides, such as vinyl chloride, vinyl fluoride, vinylidene chloride and vinylidene fluoride, for example;

heterocyclic (meth)acrylates, such as 2-(1-imidazolyl) ethyl (meth)acrylate, 2-(4-morpholinyl)ethyl (meth)acrylate and 1-(2-methacryloyloxyethyl)-2-pyrrolidone, vinyl esters, such as vinyl acetate;

styrene, substituted styrenes having an alkyl substituent in the side chain, such as, for example, α-methylstyrene and β-ethylstyrene, substituted styrenes having an alkyl substituent on the ring, such as vinyltoluene and p-methylstyrene, and halogenated styrenes, such as monochlorostyrenes, dichlorostyrenes, tribromostyrenes and tetrabromostyrenes, for example;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl ethers and isoprenyl ethers;

maleic acid derivatives such as, for example, maleic anhydride, esters of maleic acid, for example dimethyl maleate, methylmaleic anhydride, maleimide, methylmaleimide; and fumaric acid derivatives, such as dimethyl fumarate.

The fraction of units derived from comonomers can be varied in accordance with the intended use and profile of properties of the polymer. In general this fraction can be situated in the range from 0% to 45%, preferably 2% to 30% and more preferably 3% to 10%, by weight, based on the total weight of the (meth)acrylate segment.

The weathering resistance of the coatings may be improved more particularly by reducing the fraction of styrene monomers in the coating material or in the emulsion polymer, and so particularly UV-resistant coatings may be obtained by means of a styrene-free coating material. According to one particular modification of the present invention, the emulsion polymer with at least one (meth)acrylate segment contains preferably not more than 30%, more preferably not more than 15%, by weight of units derived from styrene, substituted styrenes having an alkyl substituent in the side chain, substituted styrenes having an alkyl substituent in the ring and/or halogenated styrenes, based on the total weight of the (meth)acrylate segment.

Particularly scratch-resistant and solvent-resistant coatings can be obtained more particularly by the emulsion polymer with at least one (meth)acrylate segment comprising not more than 10% by weight of units derived from (meth)acrylates which are obtainable by reacting saturated fatty acids with at least one (meth)acrylate which has reactive groups in the alcohol residue, based on the total weight of the (meth)acrylate segment. Surprising improvements are exhibited by these coatings more particularly with emulsion polymers which comprise preferably 0.05% to 5%, more preferably 0.1 to 3%, by weight of units derived from (meth)acrylates which are obtainable by reacting saturated fatty acids with at least one (meth)acrylate which has reactive groups in the alcohol residue, based on the total weight of the (meth)acrylate segment. As a (meth)acrylate with a reactive group in the alcohol residue it is possible with preference in this context to use glycidyl (meth)acrylate. Saturated fatty acids which can be reacted with a (meth)acrylate comprising at least one reactive group in the alcohol residue, preferably glycidyl (meth)acrylate, may comprise preferably 10 to 26, more preferably 12 to 22, carbon atoms. The saturated fatty acids having 10 to 26 carbon atoms include more particularly caprylic acid, capric acid, lauric acid, myristic acid, palmitic acid, margaric acid, arachidic acid, behenic acid, lignoceric acid, cerotinic acid, palmitoleic acid and stearic acid.

Preferably the emulsion polymer can have a fraction of 2% to 60%, more preferably 10% to 50% and very preferably 20% to 40%, by weight, based on the weight of the emulsion polymer, which is soluble in tetrahydrofuran (THF) at 20° C. To determine the soluble fraction, a sample of the polymer with at least one (meth)acrylate segment that has been dried in the absence of oxygen is stored in 200 times the amount of solvent, based on the weight of the sample, at 20° C. for 4 h. In order to ensure the absence of oxygen, the sample, for example, can be dried under nitrogen or under reduced pressure. Subsequently the solution is separated, by filtration for example, from the insoluble fraction. After the solvent has been evaporated the weight of the residue is determined. For example, a 0.5 g sample of an emulsion polymer dried under reduced pressure can be stored in 150 ml of THF for 4 hours.

In accordance with one preferred modification of the present invention an emulsion polymer may exhibit swelling of at least 1000%, more preferably at least 1400% and very preferably at least 1600% in tetrahydrofuran (THF) at 20° C. The upper limit on the swelling is not critical per se, the swelling preferably being not more than 5000%, more preferably not more than 3000% and very preferably not more than 2500%. To determine the swelling, a sample of the emulsion polymer that has been dried in the absence of oxygen is stored in 200 times the amount of THF at 20° C. for 4 hours. As a result the sample swells. The swollen sample is separated from the supernatant solvent. Subsequently the solvent is removed from the sample. For example, a major fraction of the solvent can be evaporated at room temperature (20° C.). Solvent residues can be removed in a drying oven (140° C.), generally over the course of 1 hour. From the weight of the solvent absorbed by the sample and the weight of the dry sample the swelling is obtained. Furthermore, the difference in the weight of the sample prior to the swelling experiment and the weight of the dried sample after the swelling experiment produces the soluble fraction of the emulsion polymer.

The particle radius of the emulsion polymer is at least 50 nm. The radius of the particles is situated preferably in the range from 60 nm to 500 nm, more preferably 70 to 150 nm and very preferably 75 to 100 nm. The radius of the particles can be determined by means of PCS (Photon Correlation Spectroscopy), the data given relating to the d50 value (50% of the particles are smaller, 50% are larger). This can be done using, for example, a Beckman Coulter N5 Submicron Particle Size Analyzer.

The glass transition temperature of the (meth)acrylate segment is situated preferably in the range from −30° C. to 70° C., more preferably in the range from −20 to 40° C. and very preferably in the range from 0 to 25° C. The glass transition temperature may be influenced via the nature and the fraction of the monomers used to prepare the (meth)acrylate segment. The glass transition temperature, Tg, of the polymer may be determined in a known way by means of Differential Scanning Calorimetry (DSC). Moreover, the glass transition temperature Tg may also be calculated approximately in advance by means of the Fox equation. According to Fox T. G., Bull. Am. Physics Soc. 1, 3, page 123 (1956) it is the case that $$\frac{1}{Tg} = \frac{x_1}{Tg_1} + \frac{x_2}{Tg_2} + \ldots + \frac{x_n}{Tg_n}$$

where $x_n$ represents the mass fraction (% by weight/100) of the monomer n and $Tg_n$ identifies the glass transition temperature, in kelvins, of the homopolymer of the monomer n. Further useful information can be found by the skilled person in the Polymer Handbook, 2nd Edition, J. Wiley & Sons, New York (1975), which gives Tg values for the most common homopolymers.

For many applications and properties the architecture of the emulsion polymer/(meth)acrylate segment is not critical. The emulsion polymers/(meth)acrylate segments may accordingly comprise random copolymers, gradient copolymers, block copolymers and/or graft copolymers. Block copolymers and gradient copolymers can be obtained, for example, by discontinuously altering the monomer composition during chain propagation. In accordance with one preferred aspect of the present invention the emulsion polymer comprises a random copolymer in which the monomer composition over the polymerization is substantially constant. Since, however, the monomers may have different copolymerization parameters, the precise composition may fluctuate over the polymer chain of the emulsion polymer/(meth)acrylate segment.

The emulsion polymer may constitute a homogeneous polymer which, for example, in an aqueous dispersion forms particles having a consistent composition. In this case the emulsion polymer may be composed of one or more (meth)acrylate segments which comprise 1% to 30% by weight of units derived from (meth)acrylates which in the alkyl radical have at least one double bond and 8 to 40 carbon atoms, 0.1% to 10% by weight of units derived from monomers containing acid groups, and 50% to 98.9% by weight of units derived from (meth)acrylates having 1 to 6 carbon atoms in the alkyl radical, based on the weight of the (meth)acrylate segment.

In accordance with another embodiment the emulsion polymer may constitute a core-shell polymer, which may have one, two, three or more shells. In this case the (meth)acrylate segment preferably forms the outermost shell of the core-shell polymer. The shell may be connected to the core or to the inner shells, by covalent bonds. Moreover, the shell may also be polymerized onto the core or onto an inner shell. In this embodiment the (meth)acrylate segments may in many cases be separated and isolated from the core by means of suitable solvents.

The weight ratio of (meth)acrylate segment to core may be situated preferably in the range from 2:1 to 1:6, more preferably 1:1 to 1:3.

The core may be formed preferably of polymers comprising 50% to 100%, preferably 60% to 90%, by weight of units derived from (meth)acrylates. Preference here is given to esters of (meth)acrylic acid whose alcohol residue comprises preferably 1 to 30 carbon atoms, more preferably 1 to 20 carbon atoms and very preferably 1 to 10 carbon atoms. They include, more particularly, (meth)acrylates deriving from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate, pentyl (meth)acrylate and hexyl (meth)acrylate.

In accordance with one particular embodiment of the present invention the core can be prepared using a mixture which comprises methacrylates and acrylates. Thus it is possible more particularly to use mixtures of methyl methacrylate and acrylates having 2 to 6 carbons, such as ethyl acrylate, butyl acrylate and hexyl acrylate.

Furthermore, the polymers of the core may comprise the comonomers set out above. In accordance with one preferred modification the core may be crosslinked. This crosslinking may be achieved through the use of monomers having two, three or more free-radically polymerizable double bonds.

The shell of an emulsion polymer of the present invention that comprises the (meth)acrylate segment may comprise preferably 15% to 28% by weight of units derived from (meth)acrylates which in the alkyl radical have at least one double bond and 8 to 40 carbon atoms.

In accordance with one particular aspect the core may preferably have a glass transition temperature in the range from −30 to 200° C., more preferably in the range from −20 to 150° C. The shell, which is formed preferably by the (meth) acrylate segment of the emulsion polymer of the invention, may preferably have a glass transition temperature in the range from −30° C. to 70° C., more preferably in the range from −20 to 40° C. and very preferably in the range from 0 to 25° C. In accordance with one particular aspect of the present invention the glass transition temperature of the core may be greater than the glass transition temperature of the shell. Judiciously the glass transition temperature of the core may be at least 10° C., preferably at least 20° C., above the glass transition temperature of the shell.

The iodine number of the emulsion polymer of the invention is preferably in the range from 1 to 150 g iodine per 100 g emulsion polymer, more preferably in the range from 2 to 100 g iodine per 100 g emulsion polymer and very preferably 5 to 40 g iodine per 100 g emulsion polymer, measured in accordance with DIN 53241-1. The iodine number may be measured more particularly on the basis of a dispersion of the invention.

Judiciously the emulsion polymer may have an acid number in the range from 0.1 to 40 mg KOH/g, preferably 1 to 20 mg KOH/g and very preferably in the range from 2 to 10 mg KOH/g. The acid number may be determined in accordance with DIN EN ISO 2114 from a dispersion.

The hydroxyl number of the emulsion polymer is situated preferably in the la range from 0 to 200 mg KOH/g, more preferably 1 to 100 mg KOH/g and very preferably in the range from 3 to 50 mg KOH/g. The hydroxyl number may be determined in accordance with ASTM E222 from a dispersion.

The emulsion polymers of the invention can be obtained by known methods of emulsion polymerization, which are set out in sources including Ullmann's Encyclopaedia of Industrial Chemistry, Fifth Edition. To do this the general approach is to prepare an aqueous phase which as well as water may include typical additives, more particularly emulsifiers and protective colloids for stabilizing the emulsion.

This aqueous phase is then admixed with monomers, and polymerization is carried out in the aqueous phase. When preparing homogeneous polymer particles, it is possible here to add a monomer mixture batchwise or continuously over a time interval.

The dispersing of the monomer phase in the aqueous phase can take place using known agents. These include, more particularly, mechanical methods and also the application of ultrasound.

The monomer mixture for preparing the emulsion polymers of the invention comprises preferably
1% to 30% by weight of (meth)acrylates which in the alkyl radical have at least one double bond and 8 to 40 carbon atoms,
0.1% to 10% by weight of monomers containing acid groups, and
50% to 98.9% by weight of (meth)acrylates having 1 to 6 carbons in the alkyl radical.

The monomer mixture more preferably contains 1% to 5% by weight of monomers containing acid groups.

In the preparation of homogeneous emulsion polymers it is possible with preference to use a monomer mixture which comprises 10% to 20% by weight of (meth)acrylates which in the alkyl radical have at least one double bond and 8 to 40 carbon atoms.

When preparing core-shell polymers it is possible to change the composition of the monomer mixture in steps, polymerization preferably taking place, before the composition is changed, to a conversion of at least 80% by weight, more preferably at least 95% by weight, based in each case on the total weight of the monomer mixture used. Core-shell polymer here stands for a polymer prepared by a two-stage or multistage emulsion polymerization, without the core-shell structure having been shown by means, for example, of electron microscopy. Monitoring of the progress of the polymerization reaction in each step can be effected in a known way, such as by gravimetry or gas chromatography, for example.

The monomer mixture for preparing the core comprises preferably 50% to 100% by weight of (meth)acrylates, particular preference being given to the use of a mixture of acrylates and methacrylates. After the core has been prepared, it is possible to graft or to polymerize onto the core, preferably, a monomer mixture which comprises 15% to 28% by weight of (meth)acrylates which in the alkyl radical have at least one double bond and 8 to 40 carbon atoms.

The emulsion polymerization is conducted preferably at a temperature in the range from 0 to 120° C., more preferably in the range from 30 to 100° C. Polymerization temperatures which have proved to be especially favourable in this context are temperatures in the range from greater than 60 to less than 90° C., judiciously in the range from greater than 70 to less than 85° C., preferably in the range from greater than 75 to less than 85° C.

The polymerization is initiated with the initiators that are customary for emulsion polymerization. Suitable organic initiators are, for example, hydroperoxides such as tert-butyl hydroperoxide or cumene hydroperoxide. Suitable inorganic initiators are hydrogen peroxide and also the alkali metal salts and the ammonium salts of peroxodisulphuric acid, more particularly ammonium, sodium and potassium peroxodisulphate. Suitable redox initiator systems are, for example, combinations of tertiary amines with peroxides or sodium disulphite and alkali metal salts and the ammonium salts of peroxodisulphuric acid, more particularly sodium and potassium peroxodisulphate. Further details can be taken from the technical literature, more particularly H. Rauch-Puntigam, Th. Völker, "Acryl- and Methacrylverbindungen", Springer, Heidelberg, 1967 or Kirk-Othmer, Encyclopaedia of Chemical Technology, Vol. 1, pages 386ff, J. Wiley, New York, 1978. Particular preference in the context of the present invention is given to the use or organic and/or inorganic initiators.

The stated initiators may be used both individually and in a mixture. They are preferably used in an amount of 0.05% to 3.0% by weight, based on the total weight of the monomers of the respective stage. It is also possible with preference to carry out the polymerization with a mixture of different polymerization initiators having different half-lives, in order to keep the flow of free radicals constant over the course of the polymerization and also at different polymerization temperatures.

Stabilization of the batch is accomplished preferably by means of emulsifiers and/or protective colloids. The emulsion is preferably stabilized by emulsifiers, in order to obtain a low dispersion viscosity. The total amount of emulsifier is preferably 0.1% to 15% by weight, more particularly 1% to 10% by weight and more preferably 2% to 5% by weight, based on the total weight of the monomers used. In accordance with one particular aspect of the present invention it is possible to add a portion of the emulsifiers during the polymerization.

Particularly suitable emulsifiers are anionic or nonionic emulsifiers or mixtures thereof, more particularly alkyl sulphates, preferably those having 8 to 18 carbon atoms in the alkyl radical, alkyl and alkylaryl ether sulphates having 8 to 18 carbon atoms in the alkyl radical and 1 to 50 ethylene oxide units;

sulphonates, preferably alkylsulphonates having 8 to 18 carbon atoms in the alkyl radical, alkylarylsulphonates having 8 to 18 carbon atoms in the alkyl radical, diesters and monoesters of sulphosuccinic acid with monohydric alcohols or alkylphenols having 4 to 15 carbon atoms in the alkyl radical; where appropriate these alcohols or alkylphenols may also have been ethoxylated with 1 to 40 ethylene oxide units;

phosphoric acid partial esters and their alkali metal and ammonium salts, preferably alkyl and alkylaryl phosphates having 8 to 20 carbon atoms in the alkyl or alkylaryl radical and 1 to 5 ethylene oxide units;

alkyl polyglycol ethers, preferably having 8 to 20 carbon atoms in the alkyl radical and 8 to 40 ethylene oxide units;

alkylaryl polyglycol ethers, preferably having 8 to 20 carbon atoms in the alkyl or alkylaryl radical and 8 to 40 ethylene oxide units;

ethylene oxide/propylene oxide copolymers, preferably block copolymers, favourably having 8 to 40 ethylene and/or propylene oxide units.

The particularly preferred anionic emulsifiers include, more particularly, fatty alcohol ether sulphates, diisooctyl sulphosuccinate, lauryl sulphate, C15-paraffinsulphonate, it being possible to use these compounds generally in the form of the alkali metal salt, more particularly the sodium salt. These compounds may be obtained commercially, more particularly, under the commercial designations Disponil® FES 32, Aerosol® OT 75, Texapon® K1296 and Statexan® K1 from the companies Cognis GmbH, Cytec Industries, Inc. and Bayer AG.

Judicious nonionic emulsifiers include tert-octylphenol ethoxylate with 30 ethylene oxide units and fatty alcohol polyethylene glycol ethers which have preferably 8 to 20 carbon atoms in the alkyl radical and 8 to 40 ethylene oxide units. These emulsifiers are available commercial under the commercial designations Triton® X 305 (Fluka), Tergitol® 15-S-7 (Sigma-Aldrich Co.), Marlipal® 1618/25 (Sasol Germany) and Marlipal® O 13/400 (Sasol Germany).

With preference it is possible to use mixtures of anionic emulsifier and nonionic emulsifier. The weight ratio of anionic emulsifier to nonionic emulsifier can judiciously be in the range from 20:1 to 1:20, preferably 2:1 to 1:10 and more preferably 1:1 to 1:5. Mixtures which have proven to be especially appropriate are those comprising a sulphate, more particularly a fatty alcohol ether sulphate, a lauryl sulphate, or a sulphonate, more particularly a diisooctyl sulphosuccinate or a paraffin sulphonate, as anionic emulsifier, and an alkylphenol ethoxylate or a fatty alcohol polyethylene glycol ether having in each case preferably 8 to 20 carbon atoms in the alkyl radical and 8 to 40 ethylene oxide units, as nonionic emulsifier.

Where appropriate the emulsifiers can also be used in a mixture of protective colloids. Suitable protective colloids include partially hydrolysed polyvinyl acetates, polyvinylpyrrolidones, carboxymethyl-, Methyl-, hydroxyethyl and hydroxypropyl-cellulose, starches, proteins, poly(meth)acrylic acid, poly(meth)acrylamide, polyvinylsulphonic acids, melamine-formaldehyde sulphonates, naphthalene-formaldehyde sulphonates, styrene-maleic acid and vinyl ether-maleic acid copolymers. If protective colloids are used they are used preferably in an amount of 0.01 to 1.0% by weight, based on the total amount of the monomers. The protective colloids may be included in the initial charge before the start of the polymerization, or metered in. The initiator may be included in the initial charge or metered in. It is also possible, furthermore, to include a portion of the initiator in the initial charge and to meter in the remainder.

The polymerization is preferably started by heating the batch to the polymerization temperature and metering in the initiator, preferably in aqueous solution. The metered feeds of emulsifier and monomers may be carried out separately or as a mixture. In the case of the metered addition of mixtures of emulsifier and monomer, the approach taken is to premix emulsifier and monomer in a mixer upstream of the polymerization reactor. Preferably the remainders of emulsifier and of monomer which have not been included in the initial charge are metered in separately from one another after the start of the polymerization. With preference it is possible to commence the metered feed 15 to 35 minutes after the start of the polymerization.

Emulsion polymers having a high fraction of insoluble polymers can be obtained in the manner set out above, the reaction parameters for obtaining a high molecular weight being known. Thus it is possible more particularly in this context to omit the use of molecular weight regulators.

One of the ways in which the adjustment of the particle radii can be influenced is via the fraction of emulsifiers. The higher this fraction, more particularly at the beginning of the polymerization, the smaller the particles obtained.

The aqueous dispersions obtained by the process of the invention can be used as coating materials. Accordingly, aqueous dispersions are a further subject of the present invention. The aqueous dispersions preferably have a solids content in the range from 10% to 70% by weight, more preferably 20% to 60% by weight. The dispersion may judiciously have a dynamic viscosity within the range from 0.1 to 180 mPas, preferably 1 to 80 mPas, and very preferably 5 to 20 mPas, measured in accordance with DIN EN ISO 2555 at 25° C. (Brookfield).

Additionally the aqueous dispersions of the invention may be provided in a known manner with additives or further components for adapting the properties of the coating material to specific requirements. These additional substances include, more particularly, drying assistants, known as siccatives, and flow improvers, pigments and dyes.

The coating materials of the invention preferably have a minimum film formation temperature of not more than 50° C., with particular preference not more than 35° C. and very particular preference not more than 25° C., a temperature which can be measured in accordance with DIN ISO 2115.

With particular preference it is possible to add siccatives to the aqueous dispersions. These siccatives include, more particularly, organometallic compounds, examples being metal soaps of transition metals, such as cobalt, manganese, lead and zirconium, for example; alkali metals or alkaline earth metals, such as lithium, potassium and calcium, for example. Examples that may be mentioned include cobalt naphthalate and cobalt acetate. The siccatives can be used individually or as a mixture, in which case particular preference is given more particularly to mixtures which comprise cobalt salts, zirconium salts and lithium salts.

The aqueous dispersions of the present invention can be used more particularly as coating materials or as additives for them. Such materials include, more particularly, paints and varnishes, impregnating compositions, adhesives and/or primer systems. With particular preference the aqueous dispersions can be employed for producing paints, varnishes or impregnating compositions for applications on wood and/or metal.

The coatings obtainable from the coating materials of the invention exhibit high solvent resistance: more particularly, only small fractions are dissolved from the coating by solvents. Preferred coatings exhibit a high resistance, more particularly, to methyl isobutyl ketone (MIBK). Hence the weight loss after treatment with MIBK amounts preferably to not more than 50% by weight, more preferably not more than 35% by weight. The absorption of MIBK amounts preferably to not more than 300% by weight, with particular preference not more than 250% by weight, based on the weight of the coating employed. These values are measured at a temperature of approximately 25° C. and over an exposure time of at least 4 hours, the coating subjected to measurement being a fully dried coating. This drying takes place in the presence of oxygen, air for example, in order to allow crosslinking.

The coatings obtained from the coating materials of the invention display a high mechanical stability. The pendulum hardness is preferably at least 20 s, more preferably at least 25 s, measured in accordance with DIN ISO 1522.

The present invention will be illustrated below with reference to an inventive example and comparative examples, without any intention thereby to restrict the invention.

INVENTIVE EXAMPLE 1

First of all, in a 2 l PE beaker, 172 g of butyl acrylate (BA), 128 g of methyl methacrylate (MMA), 80 g of methacryloyloxy-2-hydroxypropyl-linoleic ester, 20 g of methacrylic acid (MAA), 1.2 g of ammonium peroxodisulphate (APS), 12.0 g of Disponil FES 32 (30% form) and 359.18 g of water were emulsified using an Ultra-Turrax at 4000 rpm for 3 minutes. The methacryloyloxy-2-hydroxypropyl-linoleic ester was obtained by reacting linoleic acid with glycidyl methacrylate.

A 2 l glass reactor which had a water bath heating facility and was equipped with a blade stirrer was charged with 230 g of water and 0.3 g of Disponil FES 32 (30% form) and this initial charge was heated to 80° C. and admixed with 0.3 g of ammonium peroxodisulphate (APS) in solution in 10 g of water. 5 minutes after the addition of the APS, the emulsion prepared beforehand was metered in over the course of 240 minutes (interval: 3 minutes' feed, 4 minutes' pause, 237 minutes' feed of remainder).

After the end of the feeds the batch was stirred at 80° C. for 1 hour. Thereafter it was cooled to room temperature and the dispersion was filtered through VA screen fabric of 0.09 mm mesh size.

The emulsion prepared had a solids content of 40±1%, a pH of 2.6, a viscosity of 15 mPas and an $r_{N5}$ value of 83 nm.

Subsequently the swelling of the emulsion polymer in THF, and also the fraction soluble therein, were ascertained. This was done by drying a sample of the emulsion polymer under reduced pressure at 20° C. The dried sample had a weight of 0.462 g. This sample was stored in 150 ml of THF for 4 hours, after which the swollen sample was separated off on a fabric mesh (mesh size 0.09 mm). The swollen sample weighed 5.795 g and was dried initially at room temperature and subsequently in a drying oven. The dried sample weighed 0.332 g. This indicates a soluble fraction of (0.462-0.332)/0.462*100=28.1%. The swelling was (5.975-0.332)/0.332*100=1645%.

The properties of the resulting coating material were investigated by a variety of methods. On dried films, experiments relating to the solvent resistance, water absorption and hardness were carried out for this purpose.

The solvent resistance was determined using methyl isobutyl ketone (MIBK), with a sample being swollen with MIBK at room temperature for 4 hours. Thereafter the sample was taken from the solvent and excess solvent was removed. Subsequently the solvent was dried at about 140° C. for 1 hour. The fraction of the sample that is removed by the solvent is calculated from the weight loss.

The water absorption can be determined using a specimen of untreated solid pine (dimensions: 45-50 mm×45-50 mm×17 mm). The specimen was provided with a layer of varnish and placed in water at room temperature, with only the coated surface in contact with the water. The water absorption is calculated from the increase in weight of the specimen.

The hardness of the coating, which typically constitutes a measure of the scratch resistance, was investigated with the pencil hardness test and with the pendulum test. The tensile strength of the films, which typically represents a measure of the mechanical strength of the coating, was determined in accordance with DIN EN ISO 527, part 3.

The results obtained are given in Table 1.

INVENTIVE EXAMPLE 2

Inventive Example 1 was essentially repeated, but using 80 g of methacryloyloxy-2-hydroxypropyl-oleic ester. The methacryloyloxy-2-hydroxypropyloleic ester was obtained by reaction of oleic acid with glycidyl methacrylate.

The emulsion prepared had a solids content of 40±1%, a pH of 2.5, a viscosity of 16 mPas and an $r_{N5}$ value of 71 nm.

The results obtained with the methods of analysis set out above are given in Table 1.

For the purpose of comparison, commercially available alkyd resins were investigated, with investigation in Comparative Example 1 being of an alkyd resin available commercially from Worlée under the name E150W, and investigation in Comparative Example 2 being of Xyladecor, which is sold by ICI. The results obtained are given in Table 1.

COMPARATIVE EXAMPLE 3

First of all, in a 2 l PE beaker, 216 g of butyl acrylate (BA), 180 g of methyl methacrylate (MMA), 4 g of methacrylic acid (MAA), 1.2 g of ammonium peroxodisulphate (APS), 12.0 g of Disponil FES 32 (30% form) and 359.18 g of water were emulsified using an Ultra-Turrax at 4000 rpm for 3 minutes.

A 2 l glass reactor which had a water bath heating facility and was equipped with a blade stirrer was charged with 230 g of water and 0.3 g of Disponil FES 32 (30% form) and this initial charge was heated to 80° C. and admixed with 0.3 g of ammonium peroxodisulphate (APS) in solution in 10 g of water. 5 minutes after the addition of the APS, the emulsion prepared beforehand was metered in over the course of 240 minutes (interval: 3 minutes' feed, 4 minutes' pause, 237 minutes' feed of remainder).

After the end of the feeds the batch was stirred at 80° C. for 1 hour. Thereafter it was cooled to room temperature and the dispersion was filtered through VA screen fabric of 0.09 mm mesh size.

On dried films, experiments relating to the solvent resistance, water absorption and scratch resistance were carried out.

TABLE 1

Results of the investigations of properties

|  | Inventive Example 1 | Inventive Example 2 | Comparative Example 1 | Comparative Example 2 | Comparative Example 3 |
|---|---|---|---|---|---|
| Pendulum hardness [s] | 14 | 13.5 | 13.3 | 12.6 | 7 |
| Pencil hardness | 3H | 2H | <6B | B | — |
| Weight loss in MIBK [%] | 11.7 | 16.1 | 47.7 | 23.5 | dissolved |
| Weight loss in ethanol [%] | 14.7 | 18.5 | — | 24.0 | 6.3 |
| Water absorption after 24 h (blank value 38.7%) | 22.2% | 23.2 | 45.5% | 25.2% |  |
| Tensile strength [MPa] | 3.6 | 2.7 |  |  | 1.9 |

INVENTIVE EXAMPLE 3

Inventive Example 1 was essentially repeated, the dispersion being prepared via a miniemulsion process. For this purpose, 400 g of butyl acrylate, 390 g of methyl methacrylate, 200 g of methacryloyloxy-2-hydroxypropyl-linoleic ester and 10 g of methacrylic acid were emulsified with 20 g of sodium dodecyl sulphate. As a hydrophobic agent, 4% of hexadecane were added additionally. The polymerization was initiated with 1% of AIBN at 75° C. The dispersion obtained had an $r_{N5}$ value of 51 nm and a pH of 4.1. A coating formed from the dispersion showed a weight loss in MIBK of 11.7%, a water absorption after 24 h of 22.8% and a tensile strength of 5.1 MPa.

INVENTIVE EXAMPLE 4

Inventive Example 1 was essentially repeated, the dispersion being prepared via a miniemulsion process. For this purpose, 400 g of butyl acrylate, 390 g of methyl methacrylate, 200 g of methacryloyloxy-2-ethyl-linoleic ester and 10 g of methacrylic acid were emulsified with 20 g of sodium dodecyl sulphate. The methacryloyloxy-2-ethyl-linoleic ester was obtained by reaction of linoleic acid with hydroxyethyl methacrylate. As a hydrophobic agent, 4% of hexadecane were added additionally. The polymerization was initiated with 1% of AIBN at 75° C. The dispersion obtained had an $r_{N5}$ value of 65 nm and a pH of 3.9. A coating formed from the dispersion showed a weight loss in MIBK of 13.6%, a water absorption after 24 h of 9.2% and a tensile strength of 2.8 MPa.

The invention claimed is:

1. An emulsion polymer comprising at least one (meth) acrylate segment which comprises
   1% to 30% by weight of units derived from (meth)acrylates which in the alkyl radical have one double bond and 8 to 40 carbon atoms,
   0.1% to 10% by weight of units derived from monomers containing acid groups, and
   50% to 98.9% by weight of units derived from (meth) acrylates having 1 to 6 carbon atoms in the alkyl radical, based in each case on the weight of the (meth)acrylate segment, wherein the emulsion polymer has a particle radius of at least 50 nm.

2. The emulsion polymer according to claim 1, wherein the (meth)acrylate segment comprises 2% to 30% by weight of units derived from comonomers, based on the weight of the (meth)acrylate segment.

3. The emulsion polymer according to claim 1, wherein the emulsion polymer has an iodine number in the range from 5 to 40 g/100 g emulsion polymer.

4. The emulsion polymer according to claim 1, wherein the (meth)acrylates which in the alkyl radical have one double bond and 8 to 40 carbon atoms are obtained by reacting at least one unsaturated fatty acid with at least one (meth)acrylate which has at least one reactive group in the alcohol residue.

5. The emulsion polymer according to claim 4, wherein the (meth)acrylate which has at least one reactive group in the alcohol residue is a hydroxyalkyl (meth)acrylate or a (meth) acrylate having at least one epoxy group.

6. The emulsion polymer according to claim 4, wherein the (meth)acrylates which in the alkyl radical have one double bond and 8 to 40 carbon atoms are obtained by reacting unsaturated fatty acids with glycidyl (meth)acrylate.

7. The emulsion polymer according to claim 1, wherein the (meth)acrylate segment further comprises units derived from at least one selected from the group consisting of (meth) acryloyloxy-2-hydroxypropyl-linoleic ester and (meth)acryloyloxy-2-hydroxypropyl-linolenic ester, and units of (meth) acryloyloxy-2-hydroxypropyl-oleic ester.

8. The emulsion polymer according to claim 7, wherein the weight ratio of units derived from (meth)acryloyloxy-2-hydroxypropyl-linoleic ester to units derived from (meth)acryloyloxy-2-hydroxypropyl-oleic ester is greater than or equal to 1.

9. The emulsion polymer according to claim 7, wherein the (meth)acrylate segment comprises at least 40% by weight of units derived from (meth)acryloyloxy-2-hydroxypropyl-linoleic ester, based on the weight of the units derived from (meth)acrylates which in the alkyl radical have at least one double bond and 8 to 40 carbon atoms.

10. The emulsion polymer according to claim 9, wherein the (meth)acrylate segment comprises 45% to 80% by weight of units derived from (meth)acryloyloxy-2-hydroxypropyl-linoleic ester, based on the weight of the units derived from (meth)acrylates which in the alkyl radical have one double bond and 8 to 40 carbon atoms.

11. The emulsion polymer according to claim 8, wherein the (meth)acrylate segment comprises at least 10% by weight of units derived from (meth)acryloyloxy-2-hydroxypropyl-oleic ester, based on the weight of the units derived from (meth)acrylates which in the alkyl radical have one double bond and 8 to 40 carbon atoms.

12. The emulsion polymer according to claim 11, wherein the (meth)acrylate segment comprises 15% to 45% by weight of units derived from (meth)acryloyloxy-2-hydroxypropyl-oleic ester, based on the weight of the units derived from (meth)acrylates which in the alkyl radical have one double bond and 8 to 40 carbon atoms.

13. The emulsion polymer according to claim 1, wherein the (meth)acrylate segment comprises not more than 30% by weight of units derived from styrene, substituted styrenes having an alkyl substituent in the side chain, substituted styrenes having an alkyl substituent in the ring and/or halogenated styrenes, based on the weight of the (meth)acrylate segment.

14. The emulsion polymer according to claim 1, wherein the (meth)acrylate segment comprises not more than 10% by weight of units derived from (meth)acrylates which are obtained by reacting saturated fatty acids with at least one (meth)acrylate which has reactive groups in the alcohol residue, based on the weight of the (meth)acrylate segment.

15. The emulsion polymer according to claim 14, wherein the (meth)acrylate segment comprises 0.1% to 3% by weight of units derived from (meth)acrylates which are obtained by reacting saturated fatty acids with at least one (meth)acrylate which has reactive groups in the alcohol residue, based on the weight of the (meth)acrylate segment.

16. The emulsion polymer according to claim 14, wherein the saturated fatty acids have 10 to 26 carbon atoms.

17. An aqueous dispersion comprising the emulsion polymer according to claim 14, wherein the (meth)acrylates are obtained by reacting saturated fatty acids with glycidyl (meth)acrylate.

18. The emulsion polymer according to claim 1, wherein the (meth)acrylate segment is grafted onto a core or polymerized onto a core.

19. The emulsion polymer according to claim 18, wherein the core comprises 50% to 100% by weight of units derived from (meth)acrylates.

20. The emulsion polymer according to claim 18, wherein the core comprises units derived from acrylates and units derived from methacrylates.

21. The emulsion polymer according to claim 18, wherein the core is crosslinked.

22. The emulsion polymer according to claim 18, wherein the (meth)acrylate segment comprises 15% to 28% by weight of units derived from (meth)acrylates which in the alkyl radical have one double bond and 8 to 40 carbon atoms.

23. The emulsion polymer according to claim 1, wherein the (meth)acrylate segment comprises 1% to 5% by weight of units derived from monomers containing acid groups, based on the total weight of the (meth)acrylate segment.

24. The emulsion polymer according to claim 1, wherein the (meth)acrylate segment comprises 10% to 20% by weight of units derived from (meth)acrylates which in the alkyl radical have one double bond and 8 to 40 carbon atoms, based on the total weight of the (meth)acrylate segment.

25. The emulsion polymer according to claim 1, wherein the (meth)acrylate segment comprises units derived from acrylates and units derived from methacrylates.

26. The emulsion polymer according to claim 1, wherein 2% to 60% by weight of the emulsion polymer is soluble in tetrahydrofuran (THF) at 20° C.

27. The emulsion polymer according to claim 1, wherein the emulsion polymer exhibits a swelling of at least 1000% in tetrahydrofuran (THF) at 20° C.

28. An aqueous dispersion comprising emulsion polymers according to claim 1.

29. The aqueous dispersion according to claim 28, wherein the aqueous dispersion has a dynamic viscosity in the range from 1 to 80 mPas.

30. The aqueous dispersion according to claim 28, wherein the aqueous dispersion has a solids content in the range from 20% to 60% by weight.

31. A process for preparing aqueous dispersions according to claim 28, wherein a mixture comprising an aqueous phase and a monomer-comprising phase is prepared and the monomers of the monomer-comprising phase are polymerized, wherein a monomer mixture is used which comprises
  1% to 30% by weight of (meth)acrylates which in the alkyl radical have one double bond and 8 to 40 carbon atoms,
  0.1 to 10% by weight of monomers containing acid groups, and
  50% to 98.9% by weight of (meth)acrylates having 1 to 6 carbons in the alkyl radical.

32. The process according to claim 31, wherein the monomer mixture comprises 1% to 5% by weight of monomers containing acid groups.

33. The process according to claim 31, wherein the monomer mixture comprises 10% to 20% by weight of (meth)acrylates which in the alkyl radical have one double bond and 8 to 40 carbon atoms.

34. The process according to claim 31, wherein first a core is prepared with a monomer mixture which comprises
  50% to 100% by weight of (meth)acrylates having 1 to 6 carbons in the alkyl radical.

35. The process according to claim 34, wherein the monomer mixture for preparing the core comprises acrylates and methacrylates.

36. The process according to claim 34, wherein a monomer mixture is grafted onto the core or polymerized onto the core that comprises 15% to 28% by weight of (meth)acrylates which in the alkyl radical have one double bond and 8 to 40 carbon atoms.

* * * * *